(No Model.)

A. RASNER.
COMBINED SHAKER AND STRAINER.

No. 316,825. Patented Apr. 28, 1885.

WITNESSES:
Alva A. Moore,
W. E. Chaffee

Abraham Rasner
INVENTOR

BY
Connolly Bros & McTighe
ATTORNEYS

UNITED STATES PATENT OFFICE.

ABRAHAM RASNER, OF PITTSBURG, PENNSYLVANIA.

COMBINED SHAKER AND STRAINER.

SPECIFICATION forming part of Letters Patent No. 316,825, dated April 28, 1885.

Application filed October 17, 1884. (No model.)

*To all whom it may concern:*

Be it known that I, ABRAHAM RASNER, of Pittsburg, in the county of Allegheny and State of Pennsylvania, have invented certain new and useful Improvements in Combined Shakers and Strainers; and I do hereby declare that the following is a full, clear, and exact description of the invention, which will enable others skilled in the art to which it appertains to make and use the same, reference being had to the accompanying drawings, which form a part of this specification.

My invention has relation to a combined shaker and strainer adapted for use in concocting mixed drinks and beverages, where it is necessary to first agitate the ingredients and afterward separate the solid and pulpy matter from the liquid.

My invention consists in the combination, with a liquid-shaker of the ordinary form and adapted to receive the mouth of a glass or tumbler, of a perforated diaphragm or strainer secured within its walls at one side and a sufficient distance below the mouth of the same to allow of the reception of a tumbler.

Figure 1:
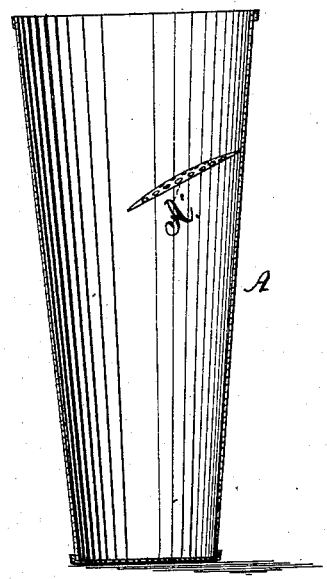
Figure 2:
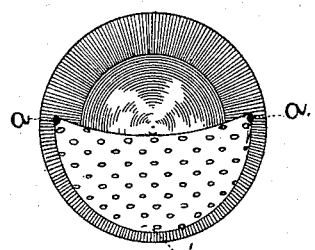

Referring to the accompanying drawings, wherein Figure 1 is a vertical sectional view and Fig. 2 a top view of my improvement, A designates the body of the shaker, which is of the usual tapering form and of any suitable material, preferably thin sheet metal.

A' designates the strainer, consisting of a semicircular or crescent-shaped and perforated diaphragm, which is located within the interior of the shaker A a sufficient distance below the mouth thereof to admit of the mouth of a glass or goblet above the same. The diaphragm A' is secured to the shaker at the points *a a* by soldering, leaving the remainder of its edge free, so that the shaker can adapt itself readily to the form of the edge of the tumbler. If desirable, however, the strainer may also be fastened at *b'* to the shaker.

The strainer A' is arranged at an angle within the shaker, its transverse edge being lower than its other edge when the shaker is in an upright position, so that no solid or pulpy matter will lodge upon its upper surface, but will slide off into the cavity below.

To further prevent the accumulation of matter on the top of the strainer, it is made slightly convex on top. The capacity of the shaker is such that the space below the strainer will contain sufficient liquid to fill the tumbler used in connection therewith.

In using the combined shaker and strainer the ingredients are first agitated between the shaker and the inverted tumbler in the usual way. Afterward the glass is removed and the liquid contents of the shaker poured into it, the shaker being held in such position that all the liquid will pass through the strainer, leaving the pulpy matter, &c., behind the same. The position of the shaker is then reversed, so that the solid matter may be poured out through the space between the strainer and the side of the shaker.

The advantages of the improvement are, that the necessity of using a separate strainer is avoided, and the utensil is easily kept clean. The strainer being attached to and forming part of the shaker, there is no danger of misplacing or losing it, and its position in the shaker facilitates the perfect mixing of the ingredients used.

Having described my invention, what I desire to claim and secure by Letters Patent is—

1. A liquor-shaker having a strainer secured within its walls below the mouth, and extending partly across the interior thereof, substantially as described.

2. A liquor-shaker having a strainer secured within its walls below the mouth, and extending partly across the interior thereof at a downward inclination from the wall toward the center of the shaker, substantially as described.

In testimony that I claim the foregoing as my own I have hereto affixed my signature in presence of two witnesses.

ABRAHAM RASNER.

Witnesses:
ALVA A. MOORE,
J. G. BACKOFEN.